Patented Feb. 13, 1945

2,369,261

UNITED STATES PATENT OFFICE 2,369,261

MANUFACTURE OF COMPOSITE CHROMIUM OXIDE PIGMENTS

Chaim Slonim, London, England

No Drawing. Application April 29, 1943, Serial No. 485,087. In Great Britain May 20, 1942

13 Claims. (Cl. 106—302)

Pigments are usually used in conjunction with an inert extender or diluent, such for example as barium sulphate, calcium sulphate, silica, kaolin, or slate powder, before incorporation with a vehicle, such as linseed oil, to form paints. Such mixtures can be made by mechanical mixing from pure pigment and extender or the mixture can be brought about by a chemical process, e. g., by simultaneous precipitation of the pigment and extender, as in the case of chrome yellow (lead sulphate and lead chromate) or Lithopone, or by precipitating the pigment on the extender as a base, as in the case of reduced chrome yellow (barium sulphate and lead chromate) or reduced Prussian blue. Mixtures produced chemically possess better qualities and covering strength. The mixture is more intimate, the tinting strength is higher and the final application easier.

Chromium oxide ($Cr_2O_3$) is a well known green pigment, and is usually manufactured by a dry method. This consists in igniting a mixture of dry sodium dichromate and sulphur, and lixiviating the resulting material. The green pigment is mixed mechanically with the required extender before application. The direct preparation of a mixture of pigment and extender by this dry method does not give a satisfactory result, because the method is a very delicate one and requires careful and skillful handling to produce the pigment alone.

It is well known that chromium oxide can be made by calcining chromic hydroxide prepared by precipitation from a chromic salt by addition of an alkali or by reducing an alkali metal chromate or dichromate by a suitable reducing agent, but this wet method of preparation is not believed to give a product suitable for use as a pigment, or at any rate requires special and complicated treatment. The separation, by filtration, of the bulky flocculent precipitate of chromic hydroxide is extremely difficult.

I have found, however, that if chromic hydroxide is precipitated from aqueous solution simultaneously with the required extender or in an aqueous suspension thereof, and the resultant solid material separated from the liquid and calcined, there results a mixture of chromium oxide and extender of satisfactory green tint and possessing all the desirable qualities above referred to which are characteristic of a properly produced chemical mixture. The presence of the extender greatly facilitates the separation of the precipitate by filtration.

The invention accordingly provides a method of preparing by chemical means a mixture of chromium oxide and an inert extender, such for example as barium sulphate, calcium sulphate, kaolin, or slate powder, which comprises precipitating from aqueous solution chromic hydroxide simultaneously with the required extender or in an aqueous suspension thereof, separating the resulting solid material and calcining it.

The chromic hydroxide may be precipitated by adding an alkali, such for example as sodium or potassium hydroxide, ammonia or sodium carbonate, to a solution of a chromic salt, such as chromic sulphate, added to a suspension of the extender. Alternatively the chromic hydroxide may be precipitated by reduction of a solution of a chromate or dichromate added to the suspension, a suitable reducing agent being sodium sulphite, sodium sulphide or a solution of sodium hydroxide containing sulphur.

If desired, the chromic hydroxide may be precipitated in a suspension of the extender obtained by previous precipitation of the latter from aqueous solution. Thus, where barium sulphate is to be used as the extender, the required suspension may be obtained by mixing solutions of sodium sulphate and barium chloride. Alternatively chromic hydroxide and barium sulphate can be precipitated simultaneously by interaction of solutions of barium chloride, sodium hydroxide and chromic sulphate.

The invention further provides a method of preparing by chemical means a mixture of chromium oxide and barium sulphate, which results in a product having all the above-mentioned advantages characteristic of a properly produced chemical mixture of pigment and extender, and which involves the use of readily available and inexpensive starting materials only.

The method according to the invention comprises admixing a solution of sodium or other alkali metal sulphate and a solution of barium sulphide then, while the resulting precipitate of barium sulphate is in suspension, mixing with the suspension a solution of sodium or other alkali metal chromate, and thereafter separating the solid material and calcining it.

This method has the advantage over the known dry process above referred to that it avoids the necessity of using sodium dichromate, which is an expensive material to manufacture, but uses sodium chromate instead. This can be obtained direct from the ore and is much cheaper. Pure barium sulphate requires an expensive chemical process for its manufacture, but I employ instead barium sulphide which can be obtained cheaply by extracting with water the product obtained by roasting barytes with coal. My third starting material, sodium sulphate, is a cheap by-product of the process now in use for manufacturing sodium dichromate.

The reaction which takes place when the above method is used takes place in two stages. First the sodium sulphate and barium sulphide react to give sodium sulphide and barium sulphate, and then the sodium sulphide reduces the sodium chromate and produces a precipitate of chromic hydroxide. The precipitated barium sulphate is thus coated (or substantially so) with chromic hydroxide, with the result that the final product, although containing only a percentage (e. g., 25%) of $Cr_2O_3$, has a self-colour nearly equal to that of pure $Cr_2O_3$. The tinting strength of such a preparation is nearly 40% greater than that of the best chromium oxide found at present on the market. The texture is quite soft without any grittiness, a quality which is otherwise very difficult to obtain with $Cr_2O_3$. The brilliance is such that mechanical mixtures of barium sulphate and chromium oxide in similar proportions appear to be grey when compared with my product. I find that, no doubt owing to the presence of barium sulphate in the precipitate, there are no undue difficulties in filtering, such as are encountered with a precipitate of chromic hydroxide alone.

It is preferred to grind, wash and dry the calcined material. By varying the amount of grinding the shade of the resulting product can be controlled. Also by varying the temperature of calcination (800–1000° C.) different shades can be obtained.

The following are detailed examples of how the invention can be carried into practice:

Example I 500 g. of pure white china clay of appropriate particle size are suspended by stirring in 500 cc. of water. 750 cc. of a sodium sulphide solution containing 180 g. of sodium sulphide are added and treated with 900 cc. of a 40% solution of sodium chromate at a temperature of from 70–100° C. After the precipitation of chromic hydroxide is effected the precipitate is separated by filtration, washed, dried and calcined at a temperature of from 700–800° C.

The calcined precipitate is then ground, washed, dried and powdered, and the resulting product contains 75% china clay and 25% chromium oxide.

Example II 500 g. of barium sulphate are suspended by stirring in 500 cc. of water. 2000 cc. of a chromium sulphate solution containing 438 g. of chromium sulphate are precipitated into this suspension by 500 cc. of an alkaline solution containing 280 g. sodium hydroxide at a temperature of 100° C. The product is filtered, and the filtered precipitate washed, dried and calcined.

The calcined precipitate is ground, washed, dried and powdered, and the resulting product contains 75% barium sulphate and 25% chromium oxide.

Example III

The same procedure is adopted as in Example II, but using kaolin or silica in place of the barium sulphate.

Example IV 500 g. of barium sulphate are precipitated by adding 2.5 litres of an aqueous barium sulphide solution containing about 363 g. of barium sulphide to 2.5 litres of an aqueous sodium sulphate solution containing 500 g. of sodium sulphate.

After the precipitation of barium sulphate is completed, 900 cc. of a 40% aqueous solution of sodium chromate are added at a temperature of from 70–100° C. The resulting precipitate is separated by filtration, washed, dried and calcined at a temperature of from 800–1000° C.

The calcined precipitate is then ground, washed, dried and powdered, and the resulting product contains 75% barium sulphate and 25% chromium oxide.

The proportions of barium sulphate and chromium oxide in the product so obtained can of course be varied. Thus where a preparation containing less $Cr_2O_3$, e. g., 15% $Cr_2O_3$ and 85% $BaSO_4$, is desired less sodium chromate solution will be used. For a preparation containing more $Cr_2O_3$, e. g., 40%, then more sodium chromate will be needed and an additional quantity of sodium sulphide will have to be added besides that derived from the reaction between the sodium sulphate and barium sulphide. In place of this additional sodium sulphide I may employ any equivalent reducing agent.

What I claim as my invention and desire to secure by Letters Patent is:

1. A method of preparing by chemical means a mixture of chromium oxide and an inert extender, which comprises precipitating chromic hydroxide from aqueous solution in an aqueous suspension of the extender, separating the resulting solid material and calcining it.

2. A method of preparing by chemical means a mixture of chromium oxide and an inert extender, which comprises precipitating chromic hydroxide from aqueous solution in an aqueous suspension of the extender, separating the resulting solid material, calcining it and thereafter grinding, washing and drying it.

3. A method of preparing by chemical means a mixture of chromium oxide and kaolin, which comprises precipitating chromic hydroxide from aqueous solution in an aqueous suspension of the extender, separating the resulting solid material and calcining it.

4. A method of preparing by chemical means a mixture of chromium oxide and an inert extender, which comprises adding an aqueous solution of a chromic salt to an aqueous suspension of the extender, precipitating chromic hydroxide by adding an alkali, separating the resulting solid material, calcining it and thereafter grinding, washing and drying it.

5. A method of preparing by chemical means a mixture of chromium oxide and an inert extender, which comprises adding an aqueous solution of a chromic acid salt to an aqueous suspension of the extender, precipitating chromic hydroxide by the action of a reducing agent, separating the resulting solid material, calcining it and thereafter grinding, washing and drying it.

6. A method as claimed in claim 5, in which a solution of sodium sulphide is used as the reducing agent.

7. A method of preparing by chemical means a mixture of chromium oxide and an inert extender, which comprises producing by precipitation an aqueous suspension of the extender, and thereafter precipitating chromic hydroxide in said suspension, separating the resulting solid material and calcining it.

8. A method of preparing by chemical means a mixture of chromium oxide and barium sulphate, which comprises admixing aqueous solutions of an alkali metal sulphate and barium sulphide, then while the resulting precipitate of barium sulphate is in suspension, mixing with the suspension an aqueous solution of an alkali metal chromate and thereafter separating the solid material and calcining it.

9. A method of preparing by chemical means a mixture of chromium oxide and barium sulphate, which comprises admixing aqueous solutions of an alkali metal sulphate and barium sulphide, then while the resulting precipitate of barium sulphate is in suspension, mixing with the suspension an aqueous solution of an alkali metal chromate and thereafter separating the solid material, calcining it and afterwards grinding, washing and drying it.

10. A method of preparing by chemical means a mixture of chromium oxide and barium sulphate, which comprises admixing aqueous solutions of sodium sulphate and barium sulphide, then while the resulting precipitate of barium sulphate is in suspension, mixing with the suspension an aqueous solution of sodium chromate and thereafter separating the solid material and calcining it.

11. A method of preparing by chemical means a mixture of chromium oxide and barium sulphate, which comprises admixing aqueous solutions of sodium sulphate and barium sulphide, then while the resulting precipitate of barium sulphate is in suspension, mixing with the suspension an aqueous solution of sodium chromate and thereafter separating the solid material, calcining it and afterwards grinding, washing and drying it.

12. A method of preparing by chemical means a mixture of chromium oxide and barium sulphate, which comprises admixing aqueous solutions of an alkali metal sulphate and barium sulphide, then while the resulting precipitate of barium sulphate is in suspension, mixing with the suspension an excess of an aqueous solution of an alkali metal chromate and a reducing agent, and thereafter separating the solid material and calcining it.

13. A method of preparing by chemical means a mixture of chromium oxide and barium sulphate, which comprises admixing aqueous solutions of sodium sulphate and barium sulphide, then while the resulting precipitate of barium sulphate is in suspension, mixing with the suspension an excess of an aqueous solution of sodium chromate and an aqueous solution of sodium sulphide, and thereafter separating the solid material, calcining it, and afterwards grinding, washing and drying it.

CHAIM SLONIM.